Dec. 8, 1953  E. C. UHLIG ET AL  2,662,032
PROCESS OF MAKING A BATTERY SEPARATOR
Filed Aug. 4, 1951  2 Sheets-Sheet 1

LIQUID PERMEABLE BATTERY SEPARATOR OF CELLULOSIC FIBROUS SHEET IMPREGNATED WITH C-STAGE PHENOL-FORMALDEHYDE RESIN AND CONTAINING WETTING AGENT APPLIED BOTH WITH THE A-STAGE RESIN AND TO THE CURED SHEET

INVENTORS
EDWIN C. UHLIG
LINWOOD A. MURRAY, JR.
BY
Robert J. Patterson
ATTORNEY

Dec. 8, 1953  E. C. UHLIG ET AL  2,662,032
PROCESS OF MAKING A BATTERY SEPARATOR
Filed Aug. 4, 1951  2 Sheets-Sheet 2

```
BIBULOUS CELLULOSIC FIBROUS SHEET
      HIGH IN ALPHA CELLULOSE
                │
                ▼
IMPREGNATE WITH AQUEOUS SOLUTION
OF A-STAGE PHENOL-FORMALDEHYDE RESIN
   CONTAINING A WETTING AGENT
                │
                ▼
               DRY
                │
                ▼
        EMBOSS TO FORM RIBS
                │
                ▼
         HEAT TO ADVANCE RESIN
              TO C-STAGE
                │
                ▼
       APPLY AQUEOUS SOLUTION OF
           WETTING AGENT TO
           HOT CURED SHEET
                │
                ▼
        CUT TO WIDTH AND LENGTH
                │
                ▼
         ALLOW TO STAND TO EFFECT
    UNIFORM DISTRIBUTION OF WETTING AGENT
                │
                ▼
         FINISHED LIQUID PERMEABLE
            BATTERY SEPARATOR
```

FIG-3

INVENTORS
EDWIN C. UHLIG
LINWOOD A. MURRAY, JR.
BY Robert J. Patterson
ATTORNEY

Patented Dec. 8, 1953

2,662,032

UNITED STATES PATENT OFFICE 2,662,032

PROCESS OF MAKING A BATTERY SEPARATOR

Edwin C. Uhlig, Greenwood, and Linwood A. Murray, Jr., Cranston, R. I., assignors to United States Rubber Company, New York, N. Y., a corporation of New Jersey Application August 4, 1951, Serial No. 240,315

5 Claims. (Cl. 117—4)

This invention relates to liquid permeable battery separators and more particularly to separators of the type which are made by impregnation of a bibulous cellulosic fibrous sheet material having a high alpha cellulose content with a solution of an A-stage phenol-formaldehyde resin in water or other aqueous medium, drying the sheet to remove the water and other volatile material and subsequently heating the impregnated sheet to convert the resin to the C-stage. Battery separators of this general type are shown in U. S. patent to Uber 2,543,137 and in our copending applications Serial Nos. 240,312 and 240,314 filed of even date herewith.

The principal object of the present invention is to provide a battery separator of the above type which contains uniformly distributed therethrough a wetting agent which facilitates wetting and penetration of the separator by the battery acid when the battery is to be prepared for service. Another object is to provide such a separator in which the wetting agent is so applied and distributed that new results are achieved. Another object is to provide a process of making a battery separator of the above type wherein the wetting agent is divided into two portions which are applied in different ways and at different points in the process whereby a new cooperation between the two portions of the wetting agent is achieved. Another object is to apply the wetting agent in such a way that new results are obtained as compared to those which would be obtained were the entire portion of the wetting agent applied either in solution in the aqueous solution of the A-stage phenolic resin used for impregnating the cellulosic sheet or to the cured sheet or separator cut therefrom. Numerous other objects of our invention will be apparent to those skilled in the art.

In the accompanying drawings:

Fig. 3 is a flow diagram of the production of battery separators in accordance with the present invention.

Figure 1:
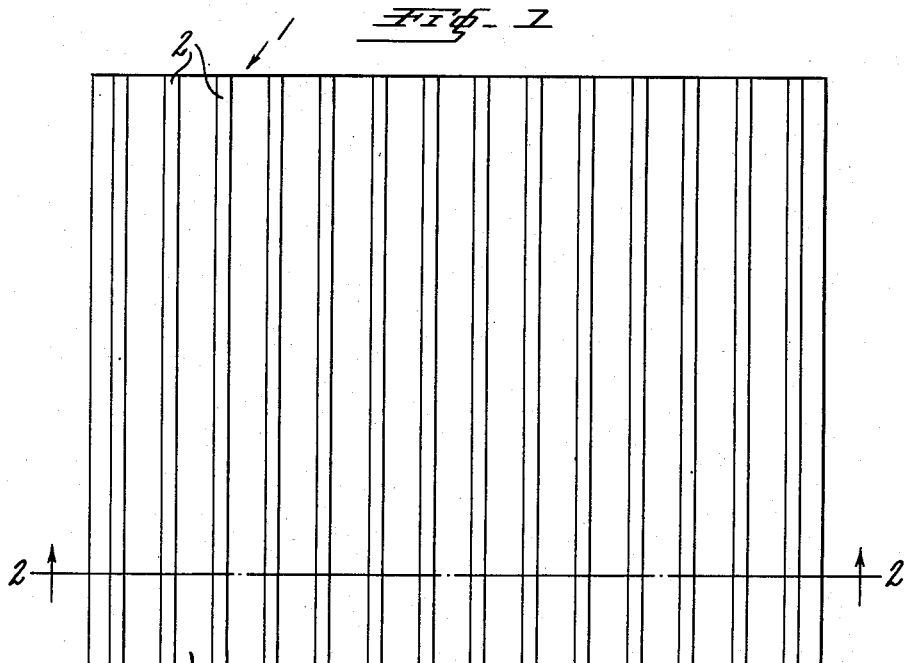
Fig. 1 is a plan view of a separator made in accordance with our invention.

The present invention is based upon our discovery that new and advantageous results are achieved if the wetting agent is introduced in two separate portions which are applied in different ways. We have found that better and far more effective utilization of the wetting agent is achieved if a portion only thereof is dissolved in the aqueous solution of the A-stage phenol-formaldehyde resin used for impregnating the bibulous cellulosic fibrous sheet and if the balance of the wetting agent is applied, preferably in the form of an aqueous solution thereof, to the cured sheet or separator, i. e., in which the resin has been heated to convert it from the A-stage to the C-stage. We much prefer to apply an aqueous solution of the second portion of the wetting agent to the cured sheet immediately or shortly after it emerges from the curing zone and while the sheet is at a temperature of from 300° to 500° F. This temperature represents residual heat left in the sheet by the curing step which is usually carried out at temperatures ranging from 300 to 550° F. and preferably at from 400° to 500° F.

We have found that application of the wetting agent in the manner described above effects new results in that that portion of the wetting agent which is distributed throughout the cured impregnated sheet as a result of solution thereof in the aqueous resin solution used for impregnating the original base sheet greatly facilitates subsequent penetration of the cured sheet by the aqueous solution of the balance of the wetting agent. We find that the results thus achieved are far superior to those which would be obtained if one attempted to apply the same total amount of wetting agent either in solution in the aqueous solution of the A-stage resin or as an aqueous solution applied to the cured sheet. Thus, if one attempted to introduce the same total amount of wetting agent in solution in the impregnating resin solution the properties of the cured resin would be injured and the properties of the resulting separator would be impaired assuming that the amount of wetting agent so applied were sufficient to bring about the desired rapid penetration of the battery acid into the separator. Consequently it is impossible to secure our results merely by increasing the amount of wetting agent dissolved in the resin solution. On the other hand, if the wetting agent is omitted from the resin solution and it is attempted to introduce the entire amount of the wetting agent by application of an aqueous solution thereof to the cured sheet, the results are unsatisfactory because the wetting agent cannot properly penetrate the sheet so as to cause good penetration of the battery acid. However, by adding part of the wetting agent to the aqueous resin solution used to impregnate the fibrous sheet and applying the rest of the wetting agent in the form of an aqueous solution in any suitable manner, as by immersion, spraying or other coating method to the cured sheet, the initially introduced portion of wetting agent left upon drying and curing is so uniformly distributed throughout the cured sheet that when the rest of the wetting agent is applied thereto it rapidly and uniformly penetrates the sheet. Thus, there is a new coaction between the two separately applied portions of wetting agent and not only is commercial production of the battery separator greatly facilitated but the resulting separator is far superior in use.

The presence in the cured sheet of a small amount of wetting agent, insufficient by itself to effect the desired wetting of the finished separator by the battery acid, as a result of incorporation with the aqueous A-stage resin solution, is effective to promote complete penetration of the cured sheet by the subsequently applied aqueous solution of the balance of the wetting agent. Evidently the first portion of the wetting agent is, upon drying, distributed throughout the resin phase in an unusually uniform and highly extended form, so that there are present interlaced continuous phases of resin and of wetting agent, the latter of course being in very minor proportion but nevertheless being exposed over the entire surface of the resin phase so that the later-applied wetting agent is completely and uniformly distributed throughout the cured resin phase.

In practicing our invention, we prefer to employ the procedure described in detail in our above-identified copending applications which are specifically directed to employing water in admixture with a specified proportion of a lower ($C_1$ to $C_3$) alkanol or acetone to dissolve the A-stage phenol-formaldehyde resin. However, the instant invention is not limited to use with that procedure but can be applied with advantageous results to battery separator production wherein the solvent for the A-stage resin consists of water as taught by the above-mentioned Uber patent.

In practicing our invention we take a bibulous cellulosic fibrous sheet containing at least 90% of alpha cellulose, having an air permeability (Gurley) of from 1 to 10 seconds and a thickness of from 0.028 to 0.038" and also exhibiting uniform "formation," and impregnate it with an aqueous solution of the phenol-formaldehyde resin and a portion of the wetting agent in such a way that from 25 to 50% of resin, based on fiber plus resin, is introduced into the sheet in such a way that upon curing the fibers are protected against battery acid but the air permeability of the sheet is not materially lowered. We then dry the sheet, emboss the dried sheet to form ribs in the form of integral protuberant portions on one side thereof and corresponding depressed portions on the other side, and cure the embossed sheet typically at 300–550° F., and preferably at 400–500° F., to advance the resin to the C-stage. We then apply, typically by spraying, an aqueous solution of the balance of the wetting agent to the hot cured sheet as it leaves the curing zone and so is at an elevated temperature, typically at 300–500° F., by reason of residual heat from the curing step. We then cut the sheet to width and length to form the finished battery separator. At some time in the operation, after application of the second portion of wetting agent, we allow the sheet or the separators cut therefrom to stand for several hours, e. g., for at least 5 hours, preferably under relatively non-evaporative conditions, to allow the aqueous solution of the second portion of the wetting agent to uniformly and throughly impregnate the entire structure of the sheet. Some of the water of the wetting agent solution unavoidably evaporates because of the relatively high temperature of the cured sheet, but under ordinary conditions sufficient water of solution remains to insure this uniform distribution of the second portion of wetting agent if the separators are allowed to stand for say .5 to 10 hours under conditions such that further evaporation of water is prevented or considerably retarded. Such relatively non-evaporative conditions can be attained in any suitable manner, as by placing a stack of the separators in a suitable enclosure, e. g., the container in which they are to be shipped, and allowing them to stand therein for the requisite period of time. The water content of the solution of the wetting agent in the sheet or separators during this standing period should be sufficiently great to hold that portion of the wetting agent which was added after curing in solution. If precipitation of the wetting agent in solid form occurs before complete penetration, a non-uniform product may result. The separators are now ready for use in the battery. Because of the peculiar distribution of the wetting agent achieved by the present invention the separators are unusually satisfactory. They are very rapidly and thoroughly penetrated by the battery acid when placed in service.

The total amount of wetting agent introduced into the separator by our invention can vary widely. The amount can range as low as 1% to as high as 10% based on the resin content of the separator. We prefer to use an amount equal to from 2 to 4% based on resin. The distribution of the wetting agent between that applied with the resin solution and that subsequently applied to the cured sheet can likewise vary widely. Typically we introduce from ½ to 4% by weight of wetting agent based on resin, with the original resin solution and later apply from ½ to 6% by weight of wetting agent, based on resin, to the hot cured sheet. We prefer to apply from ½ to 1½% (based on resin) of wetting agent in the aqueous A-stage resin solution and to later apply from 1 to 2% by weight (based on resin) of wetting agent to the hot cured sheet. We secure very advantageous results by applying 1% of wetting agent in the resin solution and 1½% of wetting agent to the hot cured sheet, these percentages of wetting agent again being by weight based upon the resin content of the sheet.

We typically introduce from one-third to one-half of the entire amount of wetting agent in solution in the impregnating resin solution and the balance, correspondingly ranging from two-thirds to one-half, to the cured sheet.

We can use any wetting agent which is effective to promote wetting of the cellulosic fibers by the aqueous resin solution and subsequent wetting of the resin-coated fibers of the separator by the battery acid and which does not introduce an objectionable contaminating influence when the battery acid is added. Any of the well known wetting agents stable to battery acid can be employed. We especially prefer to use the alkali metal salts of sulfated fatty alcohols having at least 8 carbon atoms per molecule, e. g., sodium dodecyl sulfate, sodium oleyl sulfate, etc. Examples of such alkali metal salts of sulfated fatty alcohols are the wetting agents sold commercially under the trade name "Tergitol." Another example of a suitable wetting agent is that sold as "Aerosol OT" which is a dioctyl ester of sodium sulfosuccinic acid.

Figure 2:
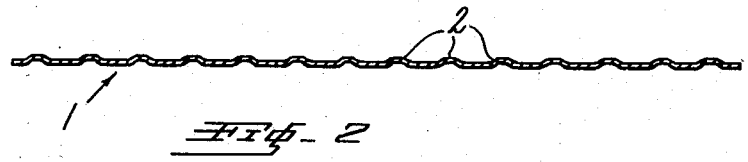
Fig. 2 is a sectional view of the separator of Fig. 1 taken on the line 2—2 thereof.

In Fig. 1 of the drawings, 1 designates the separator of the present invention, and 2 denotes the integral embossed ribs thereon. The flow diagram of Fig. 2 is self-explanatory.

EXAMPLE

A cotton linters sheet having a permeability (Gurley) of 3 to 4 seconds and a web thickness of 0.033" and exhibiting uniform "formation" was immersed in the following bath:

| | Parts by weight |
|---|---|
| "Durez 12704" (phenol-formaldehyde resin, water dilutable originally to at least 20:1, 70% non-volatiles) | 1575 |
| Isopropanol (91% isopropyl alcohol, 9% water) | 706 |
| Water | 281 |
| "Tergitol 08" (Sodium salt of sulfated 2-ethyl hexanol, 45% total solids) | 25 |

This resin solution contained about 43 percent by weight of resin solids. Upon saturation of the sheet followed by squeezing, the pick-up of the resin solution was such that the amount of resin left in the sheet was 39% based on the dry sheet plus the resin. The impregnated sheet was then dried, embossed to form spaced parallel ribs therein, and cured by passing through a slot formed between two metallic platens heated to about 450–500° F. The emerging cured sheet was then sprayed with a water solution of "Tergitol 08" which contained 3% by weight thereof. Some of the water evaporated due to the fact that the cured sheet was at about 400° F. The sheet was then trimmed to width and cut to length to form battery separators which were placed in their shipping containers and allowed to stand for 5–10 hours to effect thorough distribution of the solution of the wetting agent. The wetting agent imparted by the spraying equalled 1½% of the resin. The resulting battery separators were eminently suitable as replacement for the wood battery separators heretofore employed. The separators of this example were almost instantaneously penetrated by the battery acid when it was added to the battery.

The separators of the present invention do not need to be conditioned or maintained wet until the battery acid is added. Batteries can be assembled dry with the separators of this invention and kept dry indefinitely before the battery acid is added, without any damage.

From the foregoing description, many advantages of our invention will be apparent to those skilled in the art. The principal advantage is that the wetting agent is so introduced that maximum wetting properties are obtained with a minimum amount of wetting agent. Another advantage is that by means of our invention the necessity of using the large amounts of wetting agent which might impair the properties of the separator is obviated. Another advantage is that the wetting agent which is added with the resin solution facilitates greatly the subsequent penetration of the cured sheet by the later portion of the wetting agent so that with a given total amount of wetting agent our invention gives better and more effective utilization of the wetting agent. As explained above, our addition of the wetting agent both with the resin solution and subsequently to the cured sheet brings about a new cooperation which results in advantages which cannot be obtained if all of the wetting agent is added in the aqueous solution of the resin or is applied to the cured sheet. Another advantage is that our invention is simple to install and lends itself admirably to commercial utilization. Numerous other advantages of our invention will be obvious to those skilled in the art.

The product of the process described herein is claimed in our copending application Serial No. 240,313 filed of even date herewith.

Having thus described our invention, what we claim and desire to protect by Letters Patent is:

1. The process of making a liquid permeable battery separator which comprises impregnating a bibulous cellulosic fibrous sheet having an alpha cellulose content of at least 90 percent and having an air permeability (Gurley) of from 1 to 10 seconds with an aqueous solution of an A-stage phenol-formaldehyde resin and a wetting agent, in such manner that said sheet picks up from 25 to 50 percent by weight of said resin based on fiber plus resin, drying said sheet and thereby depositing said resin and wetting agent in and around the fibers of the sheet in such a way that upon advancing said resin to the C-stage said fibers will be protected against battery acid but the air permeability of the sheet will not be materially lowered, heating the dried sheet to a temperature of from 300° to 550° F. to advance said resin to the C-stage, applying an aqueous solution of the same wetting agent to the cured sheet, and cutting the resulting sheet into battery separators, the wetting agent applied from the aqueous solution of the resin greatly facilitating distribution of the aqueous solution of the wetting agent subsequently applied to the cured sheet, the total amount of said wetting agent introduced into the separator being equal to from 1 to 10 percent by weight based on the cured resin content of the separator, from one-third to one-half of said wetting agent being applied from said resin solution and the balance of said wetting agent being incorporated with the cured sheet while in aqueous solution, said wetting agent being of a type which facilitates penetration of the finished separator by the battery acid, being devoid of objectionable contaminating influence in the battery, and being stable to battery acid, introduction of said wetting agent in the two-stage manner described giving results considerably superior to those which would be obtained were the same total amount of wetting agent introduced in only one of said stages.

2. A process as set forth in claim 1 wherein said aqueous solution of said wetting agent is applied by coating the cured sheet while said sheet is at a temperature of from 300° to 500° F. by reason of residual heat from the curing step, with an aqueous solution of the wetting agent, and wherein the thus-coated sheet is allowed subsequently to stand for several hours under relatively non-evaporative conditions, while maintaining said last-named wetting agent dissolved in water, to allow uniform distribution of the wetting agent throughout the separator.

3. A process as set forth in claim 1 wherein the wetting agent is an alkali metal salt of a sulfated fatty alcohol having at least eight carbon atoms per molecule.

4. A process as set forth in claim 1 wherein the amount of wetting agent deposited from the aqueous solution of the A-stage resin ranges from ½ to 1½ percent by weight of the resin in the sheet and wherein the amount of wetting agent applied in aqueous solution to the cured sheet ranges from 1 to 2 percent by weight of the resin in the sheet.

5. A process set forth in claim 1 wherein the wetting agent is a sodium salt of sulfated 2-ethyl hexanol and wherein the amount thereof deposited from the aqueous solution of the A-stage resin ranges from ½ to 1½ percent by weight of the resin in the sheet and wherein the amount thereof applied in aqueous solution to the cured sheet ranges from 1 to 2 percent by weight of the resin in the sheet.

EDWIN C. UHLIG.
LINWOOD A. MURRAY, Jr.

References Cited in the file of this patent

UNITED STATES PATENTS

| Number | Name | Date |
| --- | --- | --- |
| 1,802,127 | Teague | Apr. 21, 1931 |
| 2,103,640 | Richter | Dec. 28, 1937 |
| 2,329,651 | Powers et al. | Sept. 14, 1943 |
| 2,421,363 | Young | May 27, 1947 |
| 2,529,389 | Hampton | Nov. 7, 1950 |
| 2,543,137 | Uber | Feb. 27, 1951 |

OTHER REFERENCES

McCutcheon, Soap & Sanitary Chemicals October 1949 page 49.